(12) United States Patent
Chen

(10) Patent No.: US 7,899,979 B2
(45) Date of Patent: Mar. 1, 2011

(54) COMPUTER AND BUILT-IN FLASH MEMORY STORAGE DEVICE THEREOF

(75) Inventor: Cheng-Wei Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 471 days.

(21) Appl. No.: 11/969,925

(22) Filed: Jan. 7, 2008

(65) Prior Publication Data
US 2008/0172513 A1    Jul. 17, 2008

(30) Foreign Application Priority Data
Jan. 16, 2007    (TW) .............................. 96101567 A

(51) Int. Cl.
G06F 12/00    (2006.01)
(52) U.S. Cl. .................. 711/103; 365/185.33
(58) Field of Classification Search .................. 711/103; 365/185.33
See application file for complete search history.

(56) References Cited

U.S. PATENT DOCUMENTS

| 6,148,354 A | 11/2000 | Ban et al. |
| 7,167,945 B2 * | 1/2007 | Feldstein et al. ............ 711/103 |
| 2005/0283566 A1* | 12/2005 | Callaghan .................... 711/104 |
| 2006/0184724 A1* | 8/2006 | Meir et al. .................. 711/103 |
| 2006/0200592 A1* | 9/2006 | Lambert et al. ............... 710/13 |
| 2007/0091679 A1* | 4/2007 | Nishihara et al. ...... 365/185.11 |
| 2007/0094444 A1* | 4/2007 | Sutardja ..................... 711/112 |
| 2008/0028200 A1* | 1/2008 | Polyudov ....................... 713/2 |
| 2008/0250179 A1* | 10/2008 | Moon .......................... 710/300 |

FOREIGN PATENT DOCUMENTS

| CN | 2570853 | 9/2003 |
| TW | 540768 | 7/2003 |

* cited by examiner

Primary Examiner—Hashem Farrokh
(74) Attorney, Agent, or Firm—Jianq Chyun IP Office

(57) ABSTRACT

A computer comprises a mother board. A CPU, a chipset and a flash memory storage device are configured on the mother board. Wherein, the chipset is coupled to the CPU and coupled to the flash memory storage device through a USB bus, so that the CPU is able to access data stored on the flash memory storage device through the chipset.

9 Claims, 3 Drawing Sheets

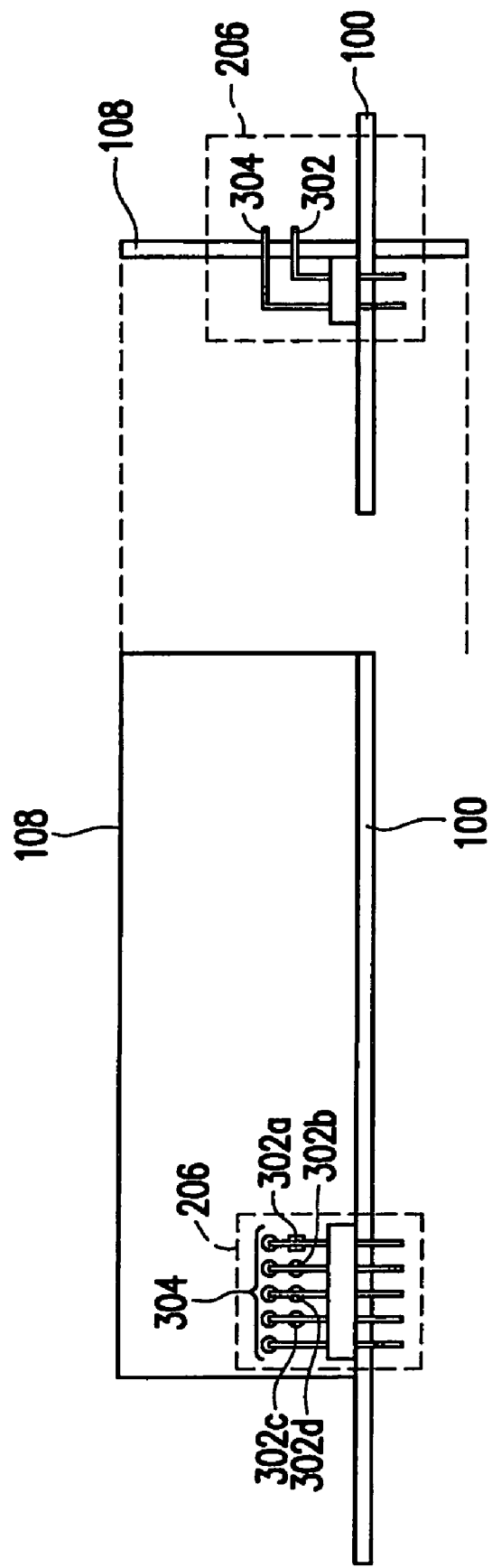

COMPUTER AND BUILT-IN FLASH MEMORY STORAGE DEVICE THEREOF

CROSS-REFERENCE TO RELATED APPLICATION

This application claims the priority benefit of Taiwan application serial no. 96101567, filed on Jan. 16, 2007. The entirety of the above-mentioned patent application is hereby incorporated by reference herein and made a part of this specification.

BACKGROUND OF THE INVENTION

1. Field of the Invention

The invention relates to a computer and, more particularly, to a computer with a flash memory which is fastened on a motherboard via a Universal Serial Bus (USB) bus.

2. Description of the Related Art

In a latest operation system, "Ready Boost" is a new function which can improve the data processing efficiency of the computer. "Ready Boost" means intelligent accessing of external storage devices, such as a current Universal Serial Bus (USB) storage device.

In details, the latest operation system supports the computer system to use the capacity of the external storage device to copy frequently used programs to the external storage device, while all data files are still saved in disk drives. For example, the operation system can copy the frequently used data to the external storage device to reduce accessing times for the disk drives. Compare with the conventional method which employs disk drives as a virtual memory, using the external storage device is more significant in keeping fast access speed, so that the operation of the computer system is smoother.

Although hot-swapping the external storage device do not cause data lost in "Ready Boost" function, it is still inconvenient to install or remove the external storage device constantly. Especially in some computer system, the interface of the external storage device, such as a USB interface, is disposed at the back of the computer.

Although there is no need to pluck the external storage device if it is installed continuously on the computer, but an external interface will be occupied and the number of the external interface will be reduced. (Although the hot-swapping problem may be avoided if the external storage device is connected to the computer continuously, a connection port would be occupied by it and the number of the available connection ports would be reduced. Furthermore, a notebook may be placed freely, and connecting an external storage device to a notebook continuously may cause problems. For example, if a notebook connected with an external storage device is placed on the ground, a user may kick the external storage device incautiously, resulting in the damage of the notebook or even the injury of the user.

BRIEF SUMMARY OF THE INVENTION

The invention provides a storage device fastened on a mother board, which can be taken as a virtual memory of a computer system for starting "Ready Boost" function.

The invention also introduces a computer for supporting an operation system with "Ready Boost" function.

In addition, the invention further provides a computer device to effectively increase the data access speed.

The invention provides a storage device fastened on a mother board, which the storage device includes a flash memory, a controller, and a USB connector. Wherein, the controller is for controlling operation of the flash memory, and the USB connector is for fastening the storage device of the invention on the mother board so that the data can be transmitted by a USB bus.

The invention also provides a computer including a mother board. A CPU, a chipset and a flash memory storage device are configured on the mother board. Wherein, the chipset is coupled to the CPU and the flash memory storage device through a USB bus. So as the CPU is able to access data of the flash memory storage device through the chipset.

The invention further provides a computer device installed an operation system with a function taking an external storage device as a virtual memory, such as a "Ready Boost" function. The computer system of the invention includes a mother board, and a CPU, a Random Access Memory (RAM), a disk drive, and a flash memory device are configured on the mother board. Wherein, the CPU has multiple Caches and can access the Caches, the RAM, and the disk drive. Especially, the CPU can employ the flash memory storage device as a virtual memory and access data of the flash memory storage device through a USB bus.

Since the circuit board of the computer system of the invention is built in the flash memory storage device, the host system of the invention can support "Ready Boost" function to efficiently increase the data access speed of the computer system of the invention.

These and other features, aspects, and advantages of the present invention will become better understood with regard to the following description, appended claims, and accompanying drawings.

BRIEF DESCRIPTION OF THE DRAWINGS

FIG. 3A is a front-view schematic diagram showing a flash memory storage device according to a preferable embodiment of the invention connected to the mother board.

FIG. 3B is an end-view schematic diagram showing a flash memory storage device according to a preferable embodiment of the invention connected to the mother board.

DETAILED DESCRIPTION OF THE EMBODIMENTS

Figure 1:
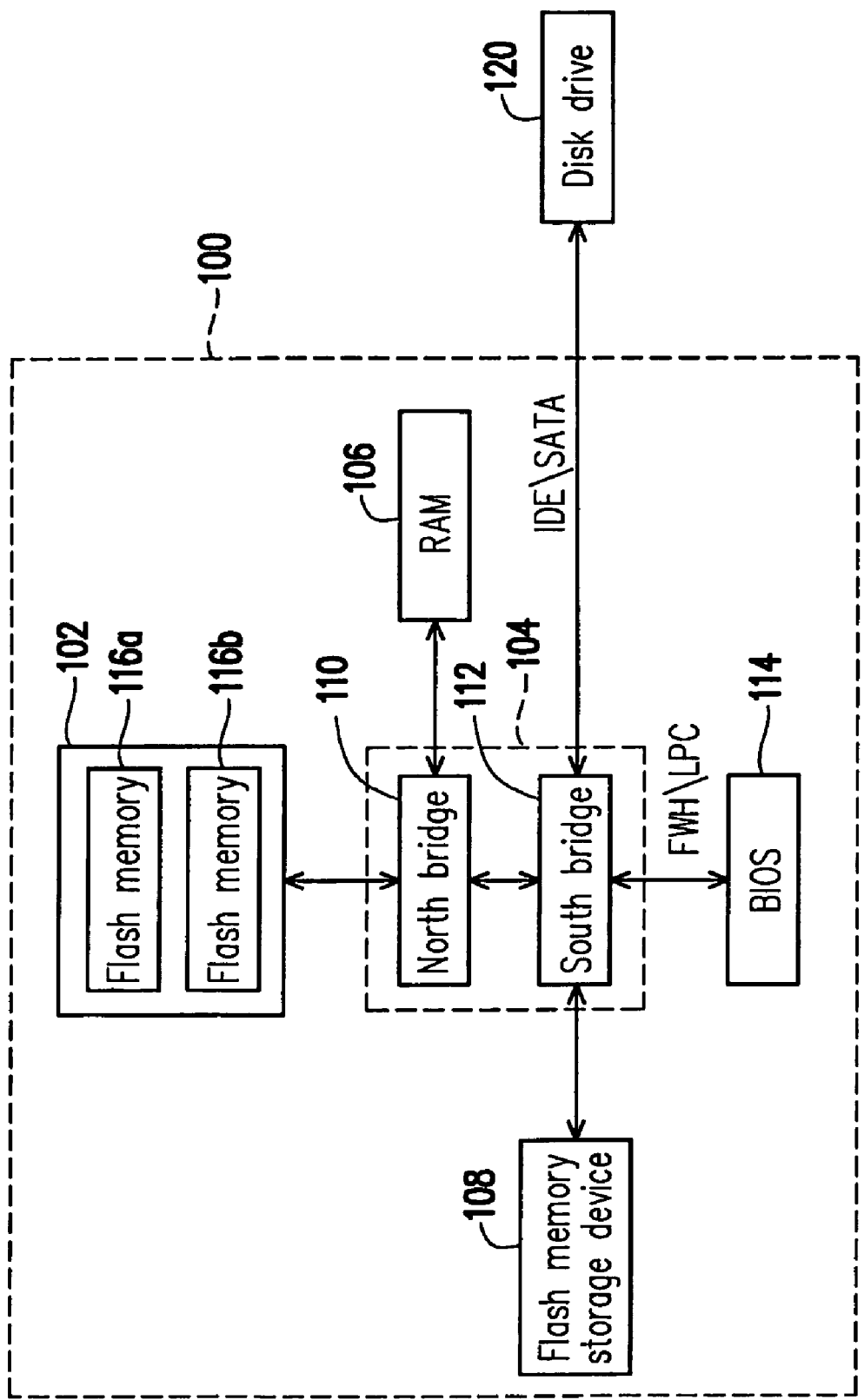
FIG. 1 is a block diagram showing the circuit of a computer according to a preferable embodiment of the invention.

FIG. 1 is a block diagram showing a circuit of a computer of a preferable embodiment according to the invention. Please refer to FIG. 1, the computer of the embodiment of the invention includes a mother board 100, wherein a CPU 102, a chipset 104, and various memory units are configured on the mother board. The computer of the embodiment of the invention is suitable for all computer system, such as a desktop or a laptop.

The memory units disposed on the mother board 100 includes a Random Access Memory (RAM) 106 and a flash memory storage device 108, both coupled to the chipset 104. In general, the RAM 106 can be a volatile memory such as Dynamic Random Access Memory (DRAM), Synchronous DRAM (SDRAM), and Double Data Rate RAM (DDR RAM). In the embodiment, the suggested capacity of the RAM 106 is at least 256 Mega Byte (MB), but not for limiting. Furthermore, the flash memory storage device 108 is coupled to the chipset 104 through a USB bus as a virtual memory of the computer.

Figure 2:
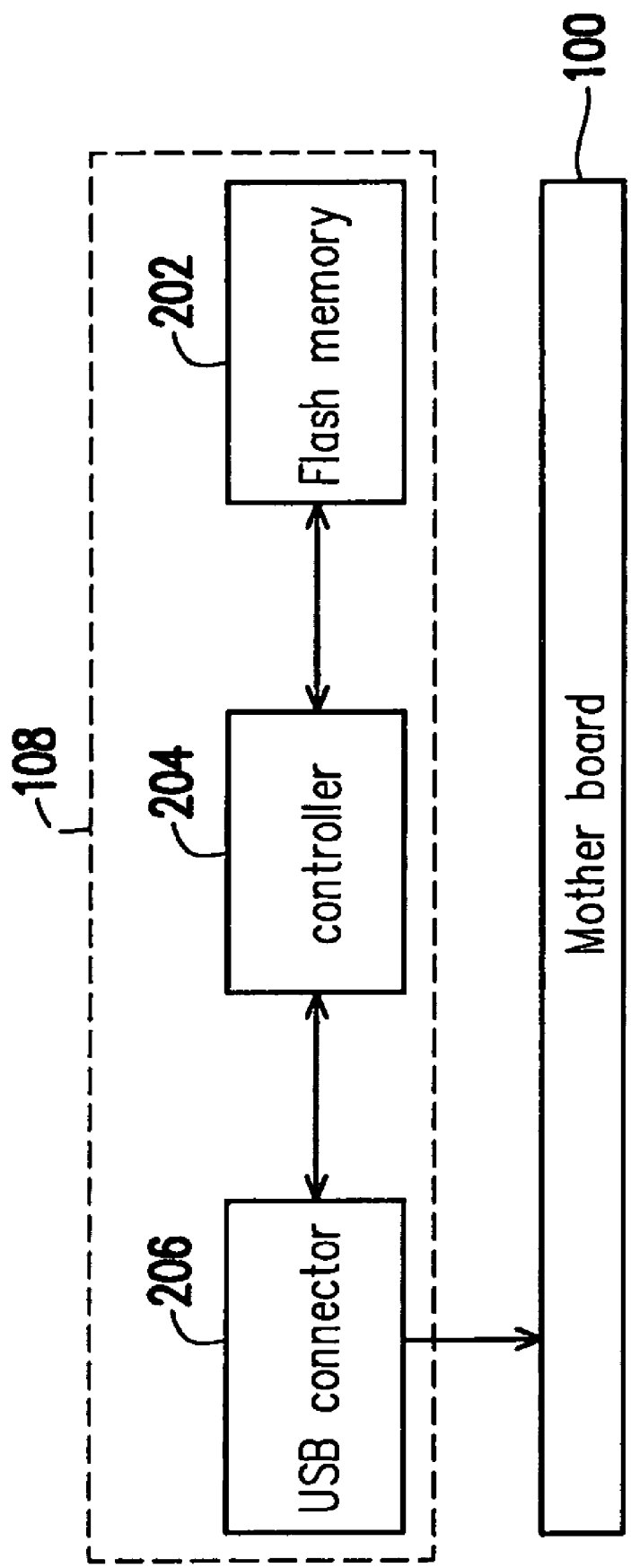
FIG. 2 is a block diagram showing the circuit of the flash memory of FIG. 1.

FIG. 2 is a block diagram showing the circuit of the flash memory storage device 108 of a preferable embodiment according to FIG. 1. Please refer to FIG. 2, the flash memory storage device 108 includes a flash memory 202, a controller 204, and a USB connector 206. Wherein, the flash memory 202 is a NAND-type flash memory, and the data access is controlled by the controller 204.

The controller 204 is coupled to the flash memory 202 to control the access of the flash memory 202. The USB connector 206 is coupled to flash memory 202 and connects to a USB bus of the mother board 100.

In the embodiment of the invention, the controller 204 can access the data of the flash memory 202 and convert them to USB bus transmitted format, and then send to USB bus by the USB connector 206 for transmission. In a preferable embodiment, the minimum reading speed of the controller 204 accessing the flash memory 108 is 2.5 MB per second. In addition, the controller 204 can convert the format of the data sent from the USB connector 206 to write in the flash memory 202. In a preferable embodiment, the minimum speed of the controller 204 writing in the flash memory 202 is 1.75 MB per second.

Please refer to FIG. 2 again, the USB connector 206 connects to the USB bus of the mother board 100 to transmit data, and fastens the flash memory storage device 108 on the mother board 100. FIGS. 3A and 3B are schematic diagrams of a front view and an end view, respectively, showing the flash memory storage device according to a preferable embodiment of the invention connected to the mother board. Please refer to FIGS. 3A and 3B, the USB connector 206 includes multiple transmission pins 302, and multiple dummy pins 304 for fastening the flashing memory storage device 108 on the mother board 100.

The transmission pins 302 include a power pin 302a, a first signal pin 302b, a second signal pin 302c, and a ground pin 320d. Wherein, the power pin 302a and the ground pin 302d connect to the power terminal and the ground terminal of the USB bus on the mother board 100 respectively. The first signal pin 302b and the second signal pin 302c connect to the positive signal terminal and the negative signal terminal of the USB bus respectively.

Please refer to FIG. 1, in general, the chipset 104 has a North Bridge (NB) chip 110 and South Bridge (SB) chip 112, wherein the NB chip is coupled to the RAM 106 for the CPU 102 accessing the RAM 106, and the SB chip 112 is coupled to the flash memory storage device 108 by the USB bus.

The SB chip 112 can be coupled to the BIOS chip 114 by a Firmware Hub (FWH) interface or a Low Pin Count (LPC) interface, and also can connect to a disk drive 120 device by an Integrated Drive Electronics (IDE) interface or a Serial ATA (SATA) interface.

In the preferred embodiment of the invention, the disk drive 120 can be installed a operation system which can take the external storage device as a virtual memory to perform functions such as Ready Boost. For example, when the "Ready Boost" function is started, the CPU 102 can take the flash memory storage device 108 as the virtual memory. That means the CPU 102 can choose to store the specific data, such as the data often used, in the flash memory storage device 108 to increase the data access speed of the computer system.

When the "Ready Boost" function is started, the CPU 102 first accesses the built-in flash memory, such as 116a and 116b. If there is no space in the flash memory 116a and 116b, or no data can be found, the CPU will access RAM 106. After that, if there is no more space in RAM 106 for data storing or no data can be found in RAM 106, the CPU will access flash memory storage device 108. Finally, the CPU will go to disk drive 120 for accessing.

According to above, the circuit board of the preferred embodiment of the invention has the built-in flash memory storage device which can be the virtual memory. Therefore, the preferred embodiment of the invention can support functions, such as "Ready Boost", which can take the external storage device as the virtual memory, so that the computer system can increase data access speed efficiently.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A storage device disposed on a mother board, comprising:
    a flash memory for storing data;
    a controller coupled to the flash memory for controlling operation of the flash memory; and
    a USB connector coupled to the flash memory and connected to a USB bus of the mother board, wherein the USB connector has a plurality of dummy pins to fasten the storage device on the mother board.

2. The storage device according to claim 1, wherein the USB connector comprises:
    a power pin connecting to a power terminal of the USB bus of the mother board;
    a ground pin connecting to a ground terminal of the USB bus of the mother board;
    a first signal pin connecting to a positive signal terminal of the USB BUS of the mother board; and
    a second signal pin connecting to a negative signal terminal of the USB bus of the mother board.

3. The storage device according to claim 1, wherein the controller accesses the data of the flash memory and converts them to a transmitted format of the USB bus, and sends to the USB bus by the USB connector.

4. The storage device according to claim 1, wherein the controller converts a format of the data sent from the USB connector to write in the flash memory.

5. A computer, comprising:
    a mother board;
    a CPU disposed on the mother board;
    a chipset disposed on the mother board and coupled to the CPU; and
    a flash memory storage device disposed on the mother board and coupled to the chipset through a USB bus, wherein the flash memory storage device includes a USB connector, and the USB connector has a plurality of dummy pins to fasten the flash memory storage device on the mother board,
    wherein the CPU accesses data of the flash memory storage device through the chipset.

6. The computer according to claim 5, wherein the chipset comprises:
    a north bridge chip coupled to the CPU; and
    a south bridge chip coupled to the north bridge and coupled to the flash memory storage device through the USB bus.

7. The computer according to claim 6, further comprising:
    a BIOS module coupled to the south bridge chip; and
    a disk drive coupled to the south bridge chip so that the CPU accessing the disk drive through the south bridge.

8. A computer device installed an operation system with a function to take an external storage device as a virtual memory, which computer device comprising:
- a mother board;
- a CPU disposed on the mother board having a plurality of flash memories;
- a RAM disposed on the mother board;
- a disk drive coupled to the mother board; and
- a flash memory storage device disposed on the mother board, and the CPU taking the flash memory as a virtual memory and accessing data of the flash memory storage device through a USB bus, wherein the flash memory storage device includes a USB connector, and the USB connector has a plurality of dummy pins to fasten the flash memory storage device on the mother board.

9. The computer device according to claim 8, wherein the access sequence of the CPU is the flash memories, the RAM, the flash memory storage device, and the disk drive in order.

* * * * *